US012782800B2

(12) United States Patent
Chien et al.

(10) Patent No.: US 12,782,800 B2
(45) Date of Patent: Nov. 3, 2026

(54) ILLUMINATION SYSTEM AND PROJECTION DEVICE

(71) Applicant: Qisda Corporation, Taoyuan City (TW)

(72) Inventors: Chih-Shiung Chien, Taoyuan City (TW); Ming-Kuen Lin, Taoyuan City (TW); Tsung-Hsun Wu, Taoyuan City (TW)

(73) Assignee: Qisda Corporation, Taoyuan City (TW)

( * ) Notice: Subject to any disclaimer, the term of this patent is extended or adjusted under 35 U.S.C. 154(b) by 238 days.

(21) Appl. No.: 18/740,539

(22) Filed: Jun. 12, 2024

(65) Prior Publication Data

US 2025/0020986 A1 Jan. 16, 2025

(30) Foreign Application Priority Data

Jul. 10, 2023 (CN) ......................... 202310839068.8

(51) Int. Cl.
*G03B 21/20* (2006.01)
*G03B 33/12* (2006.01)

(52) U.S. Cl.
CPC ..... *G03B 21/2066* (2013.01); *G03B 21/2013* (2013.01); *G03B 21/204* (2013.01); *G03B 33/12* (2013.01)

(58) Field of Classification Search
CPC .............. G03B 21/00–64; G03B 33/12; H04N 9/31–3197
See application file for complete search history.

(56) References Cited

U.S. PATENT DOCUMENTS

| | | | | |
|---|---|---|---|---|
| 2014/0111775 | A1* | 4/2014 | Nishikawa | G03B 21/2013 353/31 |
| 2018/0067281 | A1* | 3/2018 | Ichikawa | G02B 13/16 |
| 2019/0391471 | A1* | 12/2019 | Weng | G02B 26/008 |
| 2021/0157224 | A1* | 5/2021 | Liu | G02B 27/1006 |

FOREIGN PATENT DOCUMENTS

| | | |
|---|---|---|
| CN | 101957546 | 1/2011 |
| CN | 109562719 | 1/2023 |

* cited by examiner

*Primary Examiner* — Christopher A Lamb, II
(74) *Attorney, Agent, or Firm* — JCIPRNET

(57) ABSTRACT

Disclosed is an illumination system configured to provide an illumination light beam. The illumination system includes a light source module, a lens module, and a curved reflector. The light source module is configured to generate a light beam. The lens module is disposed on a transmission path of the light beam. The curved reflector is disposed on the transmission path of the light beam. The light beam is emitted sequentially from the light source module, passes through the lens module, and is reflected by the curved reflector to form the illumination light beam. A ratio between an effective focal length of the curved reflector and an effective focal length of the lens module falls within a range of 1 to 3. A projection device is also provided.

18 Claims, 7 Drawing Sheets

ILLUMINATION SYSTEM AND PROJECTION DEVICE

CROSS-REFERENCE TO RELATED APPLICATION

This application claims the priority benefit of China application serial no. 202310839068.8, filed on Jul. 10, 2023. The entirety of the above-mentioned patent application hereby incorporated by reference herein and made a part of this specification.

BACKGROUND

Technical Field

The disclosure relates to an optical system and an optical device, and in particular to an illumination system and a projection device.

Description of Related Art

Generally speaking, the illumination system used in projection devices includes different elements including light source modules, focusing and collimating modules, light homogenizing elements, and light guide modules. After the illumination light beam generated by the illumination system is converted into an image light beam by a light valve, the image light beam is projected out of the projection device through a projection lens.

In response to the demand for reducing the size of the projection device in the operating environment, such as a vehicle-mounted projection device, the light valve and the projection lens cannot be easily changed in design, which leaves the designer no choice but to change the internal design of the illumination system. However, simply reducing the number of elements in the design may only lead to poor uniformity of the illumination light beam, and as a result, the imaging effect of the projection device cannot meet basic usage requirements.

SUMMARY

The disclosure provides an illumination system and a projection device, which provide an imaging effect that meets basic usage requirements while the illumination system is reduced in size.

An embodiment of the disclosure provides an illumination system configured to provide an illumination light beam. The illumination system includes a light source module, a lens module, and a curved reflector. The light source module is configured to generate a light beam. The lens module is disposed on a transmission path of the light beam. The curved reflector is disposed on the transmission path of the light beam. The light beam is emitted sequentially from the light source module, passes through the lens module, and is reflected by the curved reflector to form the illumination light beam. A ratio between an effective focal length of the curved reflector and an effective focal length of the lens module falls within a range of 1 to 3.

An embodiment of the disclosure provides a projection device including an illumination system, a light valve, and a projection lens. The illumination system is configured to provide an illumination light beam. The illumination system includes a light source module, a lens module, and a curved reflector. The light source module is configured to generate a light beam. The lens module is disposed on a transmission path of the light beam. The curved reflector is disposed on the transmission path of the light beam. The light beam is emitted sequentially from the light source module, passes through the lens module, and is reflected by the curved reflector to form the illumination light beam. A ratio between an effective focal length of the curved reflector and an effective focal length of the lens module falls within a range of 1 to 3. The light valve is disposed on the transmission path of the illumination light beam to convert the illumination light beam into an image light beam. The projection lens is disposed on a transmission path of the image light beam and is configured to project the image light beam out of the projection device.

Based on the above, in an embodiment of the disclosure, an illumination system includes a light source module, a lens module, and a curved reflector. Therefore, the illumination system and a projection device using the illumination system are greatly reduced in size to realize a miniaturized system, so that the energy efficiency of the illumination system is improved. Furthermore, a ratio between an effective focal length of the curved reflector and an effective focal length of the lens module falls within a range of 1 to 3, which may effectively reduce a problem of poor light uniformity caused by reducing the number of elements of the illumination system, so that the imaging effect can meet basic usage requirements.

DESCRIPTION OF THE EMBODIMENTS

Figure 1:
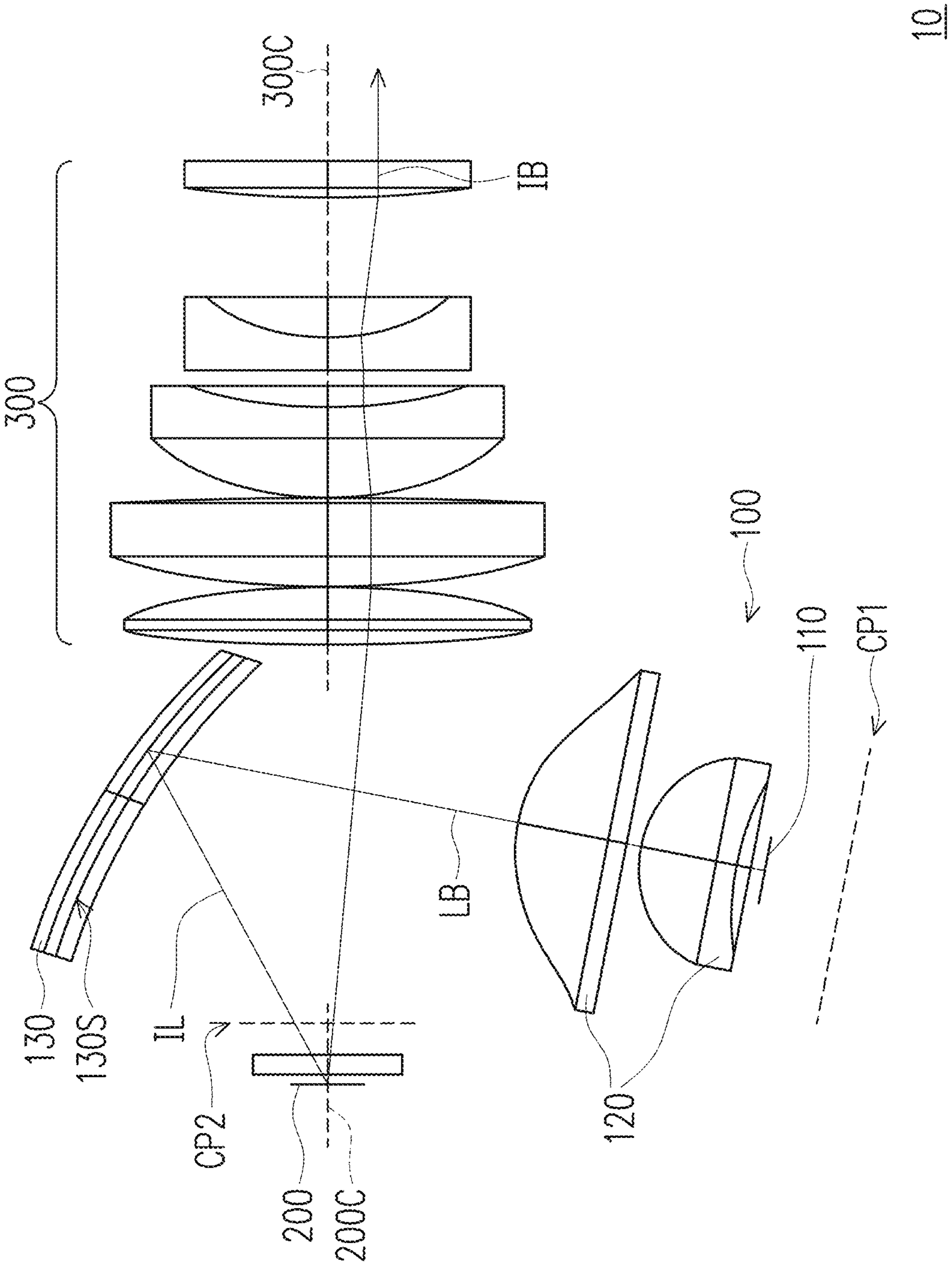
FIG. 1 is a schematic view of a projection device according to a first embodiment of the disclosure.

FIG. 1 is a schematic view of a projection device according to a first embodiment of the disclosure. Referring to FIG. 1, an embodiment of the disclosure provides a projection device 10 including an illumination system 100, a light valve 200, and a projection lens 300. The illumination system 100 is configured to provide an illumination light beam IL. The light valve 200 is disposed on a transmission path of the illumination light beam IL and is configured to convert the illumination light beam IL into an image light beam IB. The projection lens 300 is disposed on a transmission path of the image light beam IB and is configured to project the image light beam IB out of the projection device 10.

In this embodiment, the light valve 200 is, for example, a spatial light modulator such as a digital micro-mirror device (DMD), a liquid-crystal-on-silicon panel (LCOS panel) or a liquid crystal panel. In addition, the projection lens 300 includes, for example, one optical lens or a combination of multiple optical lenses with a diopter. The disclosure does not limit the projection lens 300 to a certain type or form.

In this embodiment, the illumination system 100 includes a light source module 110, a lens module 120, and a curved reflector 130.

In this embodiment, the light source module 110 is configured to generate a light beam LB. The light source module 110 includes a surface light source or a light source array formed by a plurality of point light sources. The light source is, for example, a light-emitting diode (LED) light source, a laser diode (LD) or other suitable light sources.

In this embodiment, the lens module 120 is disposed on a transmission path of the light beam LB. The lens module 120 includes, for example, one optical lens or a combination of multiple optical lenses with a diopter. The disclosure does not limit the lens module 120 to a certain type or form.

In this embodiment, the curved reflector 130 is disposed on the transmission path of the light beam LB. A reflective surface 130S of the curved reflector 130 is an aspherical curved surface, a free-form curved surface or a free-form curved surface with different diopters on different axes perpendicular to an optical axis of the curved reflector 130. When the curved reflector 130 is designed to have different diopters on different axes, a light spot of the illumination light beam IL irradiating on the light valve 200 may have different sizes on different axes. Therefore, a shape of the light spot of the illumination light beam IL may be adjusted.

In this embodiment, the light beam LB is emitted sequentially from the light source module 110, passes through the lens module 120, and is reflected by the curved reflector 130 to form the illumination light beam IL. A ratio between an effective focal length of the curved reflector 130 and an effective focal length of the lens module 120 falls within a range of 1 to 3.

In this embodiment, the illumination system 100 includes two conjugate points CP1 and CP2 in energy transmission from the light beam LB to the illumination light beam IL formed. The conjugate point CP1 may be an enlarged virtual image formed at infinity on an object side caused by the light source module 110 within the focal length of the lens module 120. The conjugate point CP2 may be a real image formed between the curved reflector 130 and the light valve 200.

In this embodiment, the curved reflector 130 and the lens module 120 are disposed respectively on two opposite sides of a central axis 200C of an optically effective area of the light valve 200, where the image light beam IB is incident to the projection lens 300 along one side of an optical axis 300C of the projection lens 300 close to the lens module 120.

In this embodiment, an aperture value (f-number or f/#) of the projection lens 300 falls within a range of 1 to 1.6.

Based on the above, in an embodiment of the disclosure, the illumination system 100 includes the light source module 110, the lens module 120, and the curved reflector 130. Therefore, the illumination system 100 and the projection device 10 using the illumination system 100 are greatly reduced in size to realize a miniaturized system. Since the number of elements of the illumination system is reduced, the energy efficiency of the illumination system is improved. Furthermore, the illumination system 100 is designed such that: the ratio between the effective focal length of the curved reflector 130 and the effective focal length of the lens module 120 falls within the range of 1 to 3, which may effectively reduce a problem of poor light uniformity caused by reducing the number of elements of the illumination system, so that an imaging effect can meet basic usage requirements.

In addition, in embodiments of the disclosure, the light source module may emit a uniform light beam LB by adopting the surface light source or the light source array formed by the plurality of point light sources. Furthermore, the projection device 10 is designed such that the aperture value (f-number or f/#) of the projection lens 300 falls within the range of 1 to 1.6, which may improve a light collection effect of the illumination system.

Figure 2:
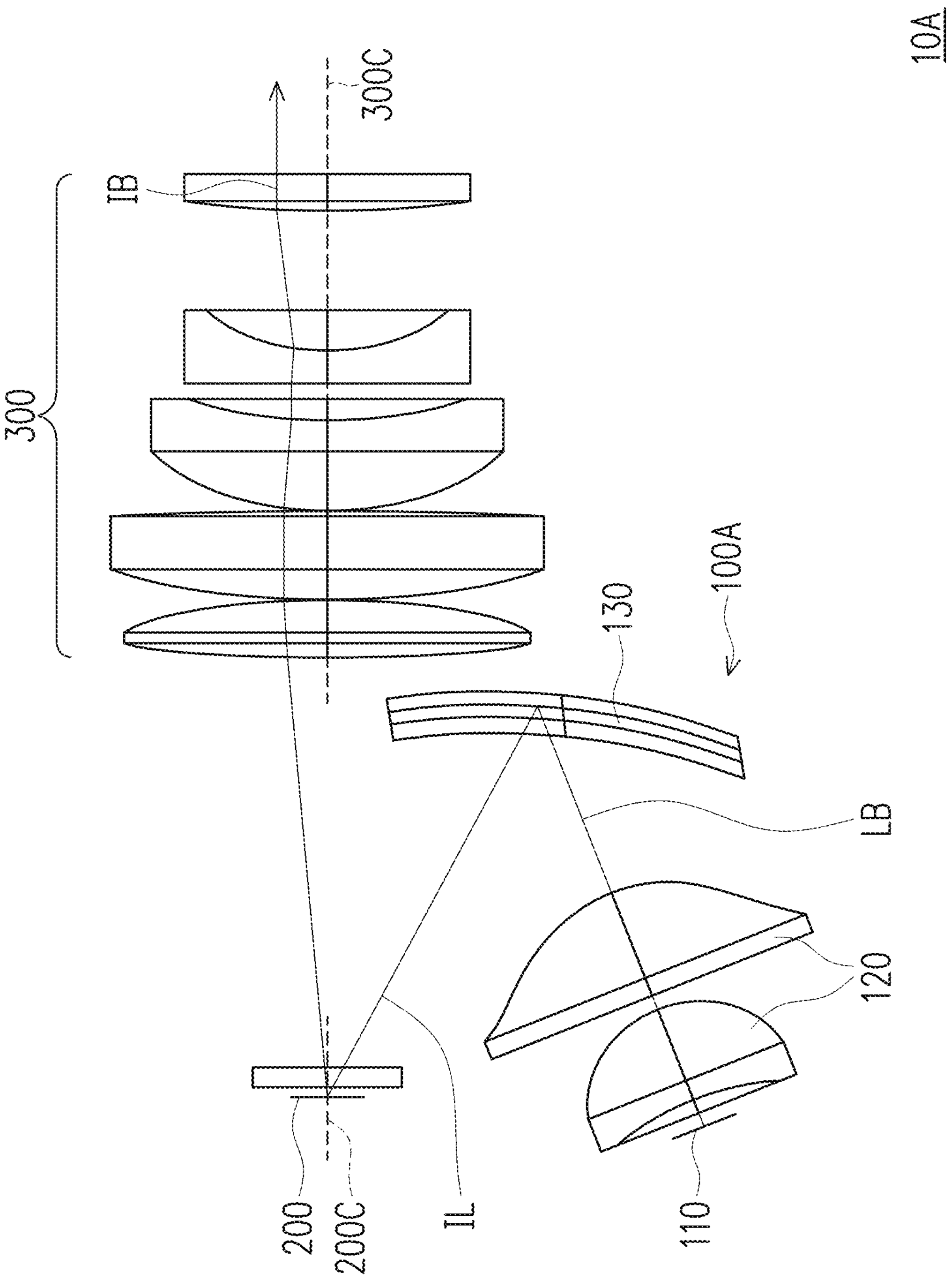
FIG. 2 is a schematic view of a projection device according to a second embodiment of the disclosure.

FIG. 2 is a schematic view of a projection device according to a second embodiment of the disclosure. Referring to FIG. 2, a projection device 10A and an illumination system 100A are similar to the projection device 10 and the illumination system 100 in FIG. 1, and the main difference lies in that: in this embodiment, the curved reflector 130 and the lens module 120 are disposed respectively on a same side of the central axis 200C of the optically effective area of the light valve 200, where the image light beam IB is incident to the projection lens 300 along one side of the optical axis 300C of the projection lens 300 away from the lens module 120. Advantages of the projection device 10A and the illumination system 100A are similar to advantages of the projection device 10 and the illumination system 100 and are not described again here.

Figure 3:
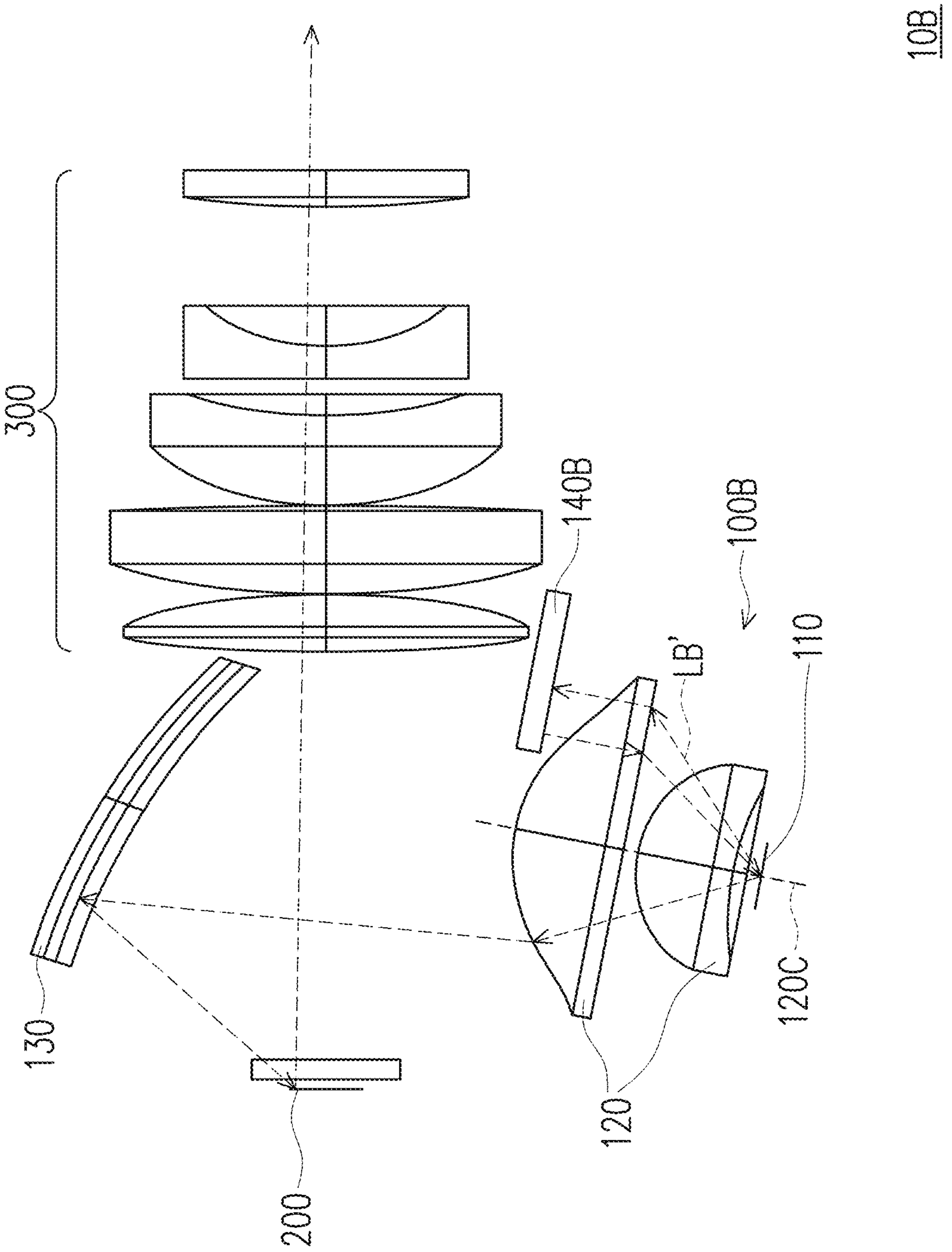
FIG. 3 is a schematic view of a projection device according to a third embodiment of the disclosure.

FIG. 3 is a schematic view of a projection device according to a third embodiment of the disclosure. Referring to FIG. 3, a projection device 10B and an illumination system 100B are similar to the projection device 10 and the illumination system 100 in FIG. 1, and the main difference lies in that: the illumination system 100B further includes a first reflector 140B. In this embodiment, the first reflector 140B is disposed on the transmission path of the light beam LB and is disposed on one side of an optical axis 120C of the lens module 120 relative to a position of the curved reflector 130 with the optical axis 120C of the lens module 120 as a center. After the light beam LB emitted from the light source module 110 passes through the lens module 120, a part of the light beam LB is transmitted directly to the curved reflector 130, and another part of the light beam LB (for example, a light beam LB') is transmitted to the first reflector 140B, is recycled by the first reflector 140B, and is transmitted sequentially to the lens module 120, the light source module 110, the lens module 120 (reflected by the light source module 110 and then transmitted to the lens module 120), and the curved reflector 130.

Based on the above, in an embodiment of the disclosure, the projection device 10B and the illumination system 100B adopt the first reflector 140B to recycle an edge beam projected to the light valve 200. Therefore, when the projection device 10B and the illumination system 100B adopt a large aperture lens, a dispersion phenomenon (that is, purple fringing) caused at an imaging edge may be reduced to achieve a better imaging effect. Advantages of the projection device 10B and the illumination system 100B are similar to advantages of the projection device 10 and the illumination system 100 and are not described again here.

Figure 4A:
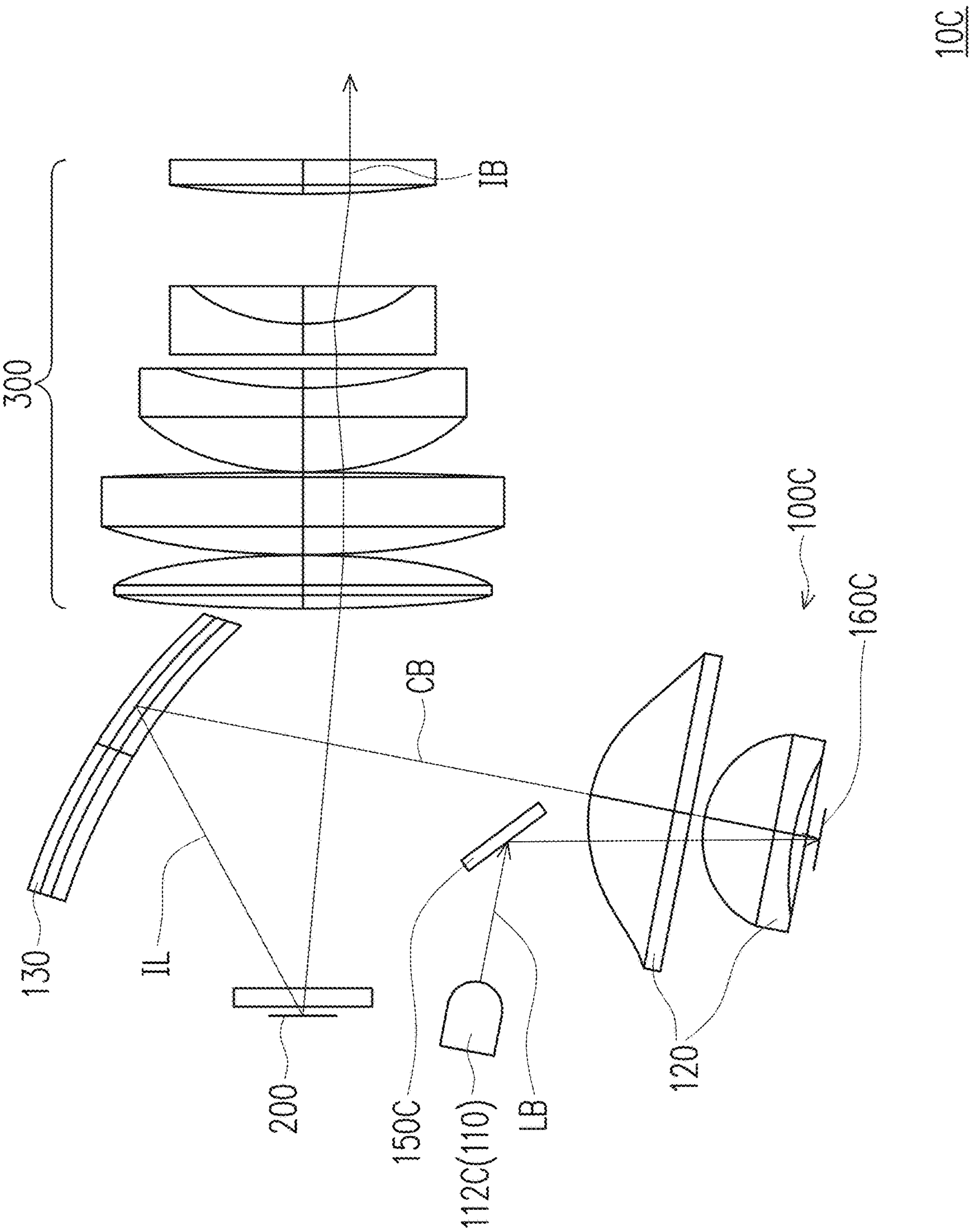
FIG. 4A is a schematic view of a projection device according to a fourth embodiment of the disclosure.

FIG. 4A is a schematic view of a projection device according to a fourth embodiment of the disclosure. Referring to FIG. 4A, a projection device 10C and an illumination system 100C are similar to the projection device 10 and the illumination system 100 in FIG. 1, and the main difference lies in that: the light source module 110 includes an excitation light source 112C, and the light beam LB is an excitation light beam. In this embodiment, the illumination system 100C further includes a second reflector 150C and a wavelength converter 160C. The second reflector 150C is disposed on the transmission path of the light beam LB. The wavelength converter 160C is disposed on the transmission path of the light beam LB. The second reflector 150C is configured to reflect the light beam LB emitted from the light source module 110 to the wavelength converter 160C, and after being reflected by the second reflector 150C, the light beam LB passes through the lens module 120 and then is transmitted to the wavelength converter 160C.

Figure 4B:
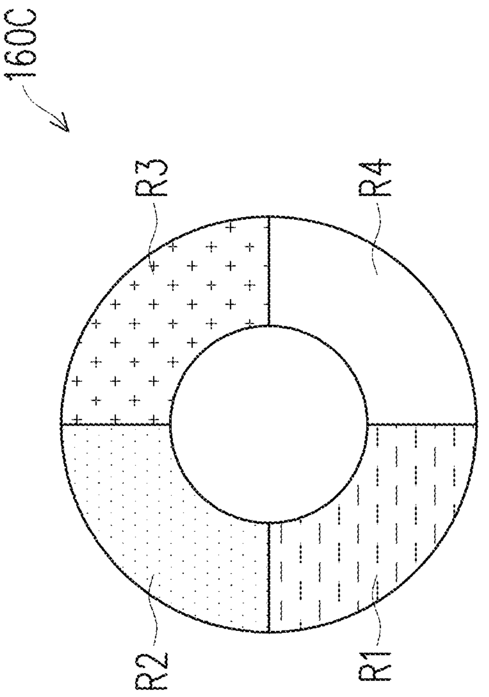
FIG. 4B is a schematic view of a wavelength converter in FIG. 4A.

FIG. 4B is a schematic view of a wavelength converter in FIG. 4A. Referring to FIG. 4A and FIG. 4B, in this embodiment, the wavelength converter 160C includes at least one wavelength conversion area R1, R2, and R3. The light beam LB is converted into at least one converted light beam CB by the at least one wavelength conversion area R1, R2, and R3. The converted light beam CB transmitted to the curved reflector 130 is reflected by the curved reflector 130 to form the illumination light beam IL, where the wavelength conversion areas R1, R2, and R3 include, for example, a fluorescent layer. The light beam LB is, for example, a blue light beam. After the light beam LB is irradiated into the wavelength conversion areas R1, R2, and R3, the wavelength conversion areas R1, R2, and R3 convert the light beam LB into fluorescent light. The converted light beam CB may be a yellow light beam, a green light beam, a red light beam or a combination thereof. However, the disclosure does not limit the light beam LB and the converted light beam CB to which color light beams respectively.

In this embodiment, the wavelength converter 160C further includes a non-wavelength conversion area R4. A part of the light beam LB is converted into the converted light beam CB by the wavelength conversion areas R1, R2, and R3. The another part of the light beam LB is reflected by the non-wavelength conversion area R4. The converted light beam CB transmitted to the curved reflector 130 and the another part of the light beam LB are reflected by the curved reflector 130 to form the illumination light beam IL.

In this embodiment, the wavelength converter 160C may be a fixed component or a rotatable component, where the rotatable component is, for example, a rotating disc. When the wavelength converter 160C is selected as a rotatable component, the wavelength conversion areas R1, R2, an R3 and the non-wavelength conversion area R4 may be designed to be switched to the transmission path of the light beam LB at different timings, so that the converted light beam CB and the another part of the light beam LB are transmitted to the curved reflector 130 and the light valve 200 at different timings.

Based on the above, in an embodiment of the disclosure, the light source module 110 of the projection device 10C and the illumination system 100C includes an excitation light source 112C. The light beam LB is the excitation light beam. Moreover, the projection device 10C and the illumination system 100C further include the wavelength converter 160C. Therefore, in addition to a size of the excitation light beam hitting the wavelength converter 160C, brightness and uniformity of the illumination light beam IL and the image light beam IB may also be adjusted. Advantages of the projection device 10C and the illumination system 100C are similar to advantages of the projection device 10 and the illumination system 100 and are not described again here.

Figure 5:
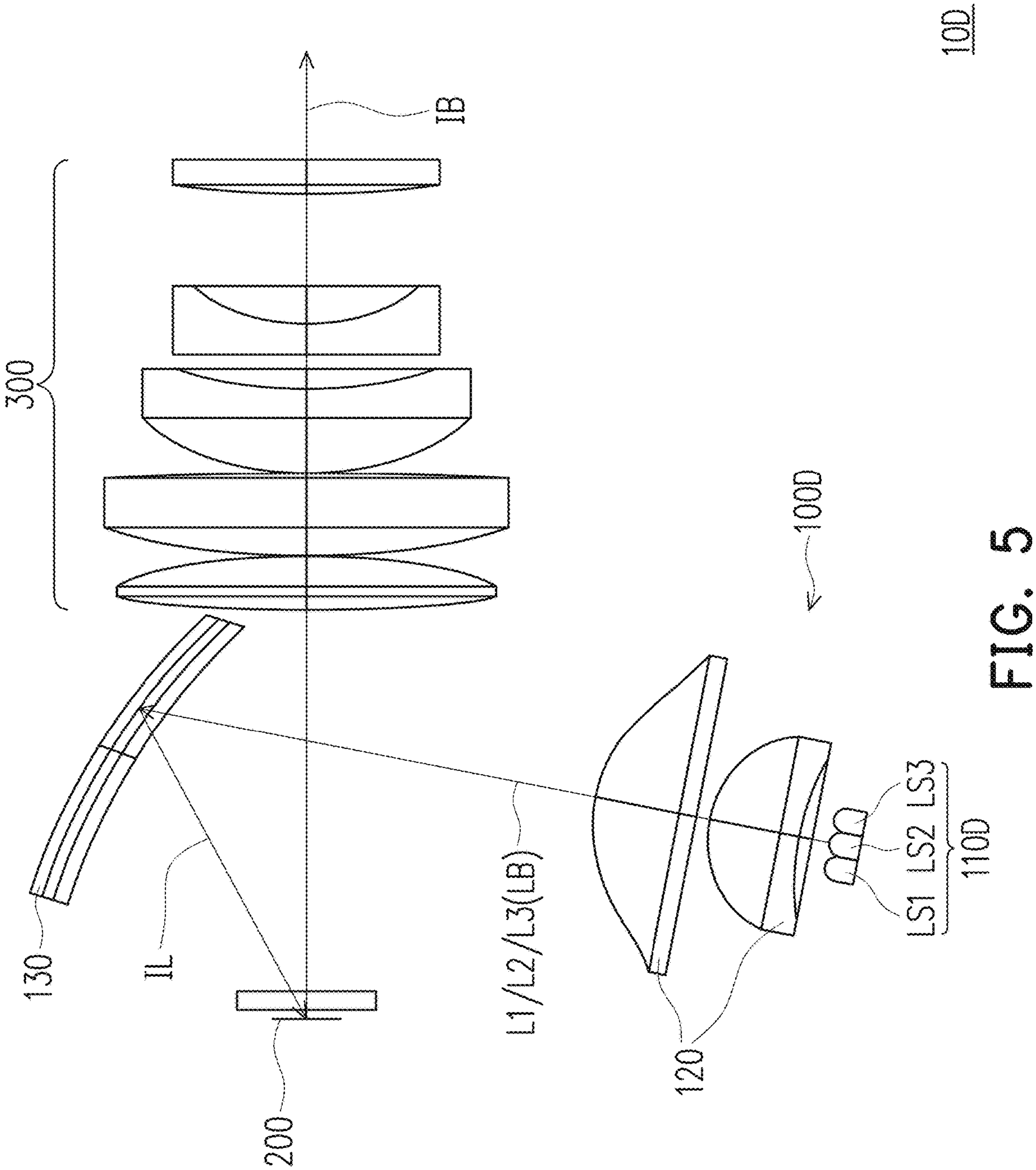
FIG. 5 is a schematic view of a projection device according to a fifth embodiment of the disclosure.

FIG. 5 is a schematic view of a projection device according to a fifth embodiment of the disclosure. Referring to FIG. 5, a projection device 10D and an illumination system 100D are similar to the projection device 10 and the illumination system 100 in FIG. 1, and the main difference lies in that: a light source module 110D includes a plurality of light sources LS1, LS2, and LS3. The light sources LS1, LS2, and LS3 are configured to emit lights L1, L2, and L3 of different wavelengths respectively. The lights L1, L2, and L3 of different wavelengths form the light beam LB.

Based on the above, in an embodiment of the disclosure, the light source module 110D of the projection device 10D and the illumination system 100D includes the plurality of light sources LS1, LS2, and LS3, and the light sources LS1, LS2, and LS3 are configured to emit the lights L1, L2, and L3 of different wavelengths respectively. Therefore, the projection device 10D and the illumination system 100D may provide colored image light beams IB and the illumination light beams IL. Advantages of the projection device 10D and the illumination system 100D are similar to advantages of the projection device 10 and the illumination system 100 and are not described again here.

Figure 6:
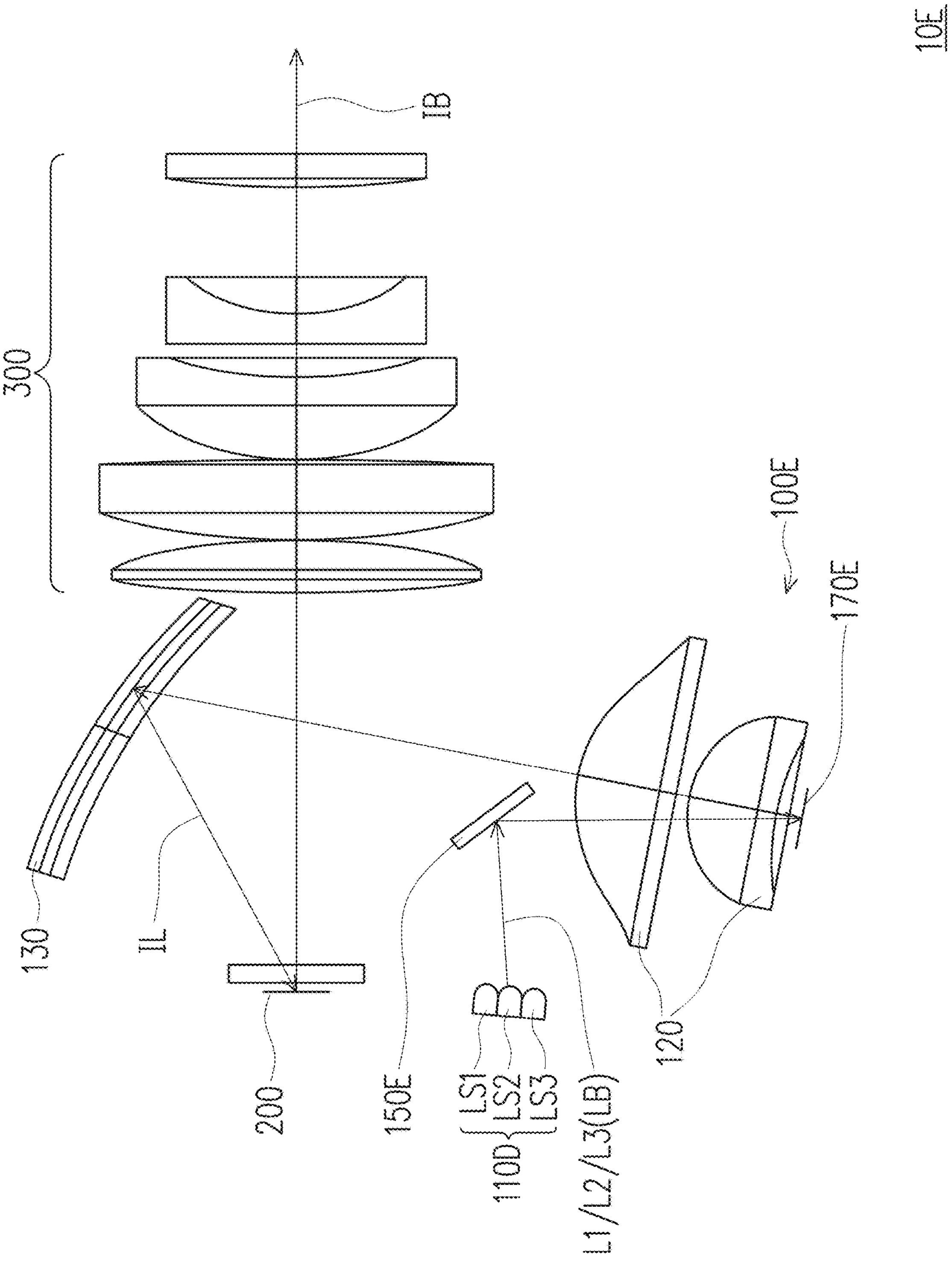
FIG. 6 is a schematic view of a projection device according to a sixth embodiment of the disclosure.

FIG. 6 is a schematic view of a projection device according to a sixth embodiment of the disclosure. Referring to FIG. 6, a projection device 10E and an illumination system 100E are similar to the projection device 10D and the illumination system 100D in FIG. 5, and the main difference lies in that: the illumination system 100D further includes a second reflector 150E and a third reflector 170E. The second reflector 150E is disposed on the transmission path of the light beam LB. The second reflector 150E or the third reflector 170E may be a fixed component or a rotatable component. The third reflector 170E is disposed on the transmission path of the light beam LB. The second reflector 150E is configured to reflect the light beam LB to the third reflector 170E. The third reflector 170E is configured to reflect the light beam LB to the curved reflector 130, and after being reflected by the second reflector 150E, the light beam LB sequentially passes through the lens module 120, is reflected by the third reflector 170E, passes through the lens module 120, and is transmitted to the curved reflector 130. Advantages of the projection device 10E and the illumination system 100E are similar to advantages of the projection device 10D and the illumination system 100D and are not described again here.

To sum up, in an embodiment of the disclosure, an illumination system includes a light source module, a lens module, and a curved reflector. Therefore, the illumination system and the projection device using the illumination system are greatly reduced in size to realize a miniaturized system. Since the number of elements of the illumination system is reduced, the energy efficiency of the illumination system is improved. Furthermore, the illumination system is designed such that the ratio between the effective focal length of the curved reflector and the effective focal length of the lens module falls within the range of 1 to 3, which may effectively reduce the problem of poor light uniformity caused by reducing the number of elements of the illumination system, so that the imaging effect can meet basic usage requirements.

What is claimed is:

1. An illumination system, configured to provide an illumination light beam, comprising:

a light source module, configured to generate a light beam;

a lens module, disposed on a transmission path of the light beam;

a curved reflector, disposed on the transmission path of the light beam; and a first reflector, disposed on the transmission path of the light beam and disposed on one side of an optical axis of the lens module relative to a position of the curved reflector with the optical axis of the lens module as a center, wherein the light beam is emitted sequentially from the light source module, passes through the lens module, and is reflected by the curved reflector to form the illumination light beam, wherein a ratio between an effective focal length of the curved reflector and an effective focal length of the lens module falls within a range of 1 to 3, wherein after the light beam emitted from the light source module passes through the lens module, a part of the light beam is transmitted directly to the curved reflector, and another part of the light beam is transmitted to the first reflector, is recycled by the first reflector, and is transmitted sequentially to the lens module, the light source module, the lens module, and the curved reflector.

2. The illumination system according to claim 1, wherein the illumination system comprises two conjugate points in energy transmission from the light beam to the illumination light beam.

3. The illumination system according to claim 1, wherein the light source module comprises a surface light source or a light source array formed by a plurality of point light sources.

4. The illumination system according to claim 1, wherein a reflective surface of the curved reflector is an aspherical curved surface, a free-form curved surface or a free-form curved surface with different diopters on different axes perpendicular to an optical axis of the curved reflector.

5. The illumination system according to claim 1, wherein the light source module comprises an excitation light source, and the light beam is an excitation light beam.

6. The illumination system according to claim 5, further comprising:

a second reflector, disposed on the transmission path of the light beam; and a wavelength converter, disposed on the transmission path of the light beam, wherein the second reflector is configured to reflect the light beam emitted from the light source module to the wavelength converter.

7. The illumination system according to claim 6, wherein the wavelength converter comprises at least one wavelength conversion area, the light beam is converted into at least one converted light beam by the at least one wavelength conversion area, and the at least one converted light beam transmitted to the curved reflector is reflected by the curved reflector to form the illumination light beam.

8. The illumination system according to claim 6, wherein the wavelength converter comprises at least one wavelength conversion area and a non-wavelength conversion area, a part of the light beam is converted into at least one converted light beam by the at least one wavelength conversion area, another part of the light beam is reflected by the non-wavelength conversion area, and the at least one converted light beam transmitted to the curved reflector and the another part of the light beam are reflected by the curved reflector to form the illumination light beam.

9. The illumination system according to claim 1, wherein the light source module comprises a plurality of light sources, the plurality of light sources are configured to emit lights of different wavelengths respectively, and the lights of different wavelengths form the light beam.

10. The illumination system according to claim 9, further comprising:

a second reflector, disposed on the transmission path of the light beam; and a third reflector, disposed on the transmission path of the light beam, wherein the second reflector is configured to reflect the light beam to the third reflector, and wherein the third reflector is configured to reflect the light beam to the curved reflector.

11. A projection device, comprising:

an illumination system, configured to provide an illumination light beam and comprising:

a light source module, configured to generate a light beam;

a lens module, disposed on a transmission path of the light beam;

a curved reflector, disposed on the transmission path of the light beam; and a first reflector, disposed on the transmission path of the light beam and disposed on one side of an optical axis of the lens module relative to a position of the curved reflector with the optical axis of the lens module as a center, wherein the light beam is emitted sequentially from the light source module, passes through the lens module, and is reflected by the curved reflector to form the illumination light beam, wherein a ratio between an effective focal length of the curved reflector and an effective focal length of the lens module falls within a range of 1 to 3, wherein after the light beam emitted from the light source module passes through the lens module, a part of the light beam is transmitted directly to the curved reflector, and another part of the light beam is transmitted to the first reflector, is recycled by the first reflector, and is transmitted sequentially to the lens module, the light source module, the lens module, and the curved reflector;

a light valve, disposed on a transmission path of the illumination light beam and configured to convert the illumination light beam into an image light beam; and a projection lens, disposed on a transmission path of the image light beam and configured to project the image light beam out of the projection device.

12. The projection device according to claim 11, wherein the curved reflector and the lens module are disposed respectively on two opposite sides of a central axis of an optically effective area of the light valve.

13. The projection device according to claim 11, wherein the curved reflector and the lens module are disposed on a same side of a central axis of an optically effective area of the light valve.

14. The projection device according to claim 11, wherein an aperture value of the projection lens falls within a range of 1 to 1.6.

15. The projection device according to claim 11, wherein the light source module comprises an excitation light source, and the light beam is an excitation light beam.

16. The projection device according to claim 15, wherein the illumination system further comprises:

a second reflector, disposed on the transmission path of the light beam; and a wavelength converter, disposed on the transmission path of the light beam, wherein the second reflector is configured to reflect the light beam emitted from the light source module to the wavelength converter.

17. The projection device according to claim 16, wherein the wavelength converter comprises at least one wavelength conversion area, the light beam is converted into at least one converted light beam by the at least one wavelength conversion area, and the at least one converted light beam transmitted to the curved reflector is reflected by the curved reflector to form the illumination light beam.

18. The projection device according to claim 16, wherein the wavelength converter comprises at least one wavelength conversion area and a non-wavelength conversion area, a part of the light beam is converted into at least one converted light beam by the at least one wavelength conversion area, another part of the light beam is reflected by the non-wavelength conversion area, and the at least one converted light beam transmitted to the curved reflector and the another part of the light beam are reflected by the curved reflector to form the illumination light beam.

* * * * *